(12) United States Patent
Endou et al.

(10) Patent No.: US 12,322,551 B2
(45) Date of Patent: *Jun. 3, 2025

(54) MULTILAYER CERAMIC CAPACITOR

(71) Applicant: Murata Manufacturing Co., Ltd., Nagaokakyo (JP)

(72) Inventors: Takumi Endou, Nagaokakyo (JP); Sho Watanabe, Nagaokakyo (JP); Akito Mori, Nagaokakyo (JP); Masahiro Wakashima, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/646,890

(22) Filed: Apr. 26, 2024

(65) Prior Publication Data

US 2024/0274356 A1 Aug. 15, 2024

Related U.S. Application Data

(63) Continuation of application No. 17/947,446, filed on Sep. 19, 2022, now Pat. No. 11,984,265.

(30) Foreign Application Priority Data

Sep. 30, 2021 (JP) .................................. 2021-161110

(51) Int. Cl.
*H01G 4/12* (2006.01)
*H01G 4/008* (2006.01)

(52) U.S. Cl.
CPC ........... *H01G 4/1218* (2013.01); *H01G 4/008* (2013.01)

(58) Field of Classification Search
CPC ...... H01G 4/008; H01G 4/012; H01G 4/1218; H01G 4/30
See application file for complete search history.

(56) References Cited

U.S. PATENT DOCUMENTS

| | | | | |
|---|---|---|---|---|
| 3,740,624 | A | * | 6/1973 | McAdams, Jr. ......... H01G 4/30 361/303 |
| 11,984,265 | B2 | * | 5/2024 | Endou .................. H01G 4/1227 |

FOREIGN PATENT DOCUMENTS

CN 102266939 A 12/2011

OTHER PUBLICATIONS

Endou et al., "Multilayer Ceramic Capacitor", U.S. Appl. No. 17/947,446, filed Sep. 19, 2022.
Official Communication issued in corresponding Chinese Patent Application No. 202210977870.9, mailed on Sep. 30, 2024, 7 pages.

* cited by examiner

*Primary Examiner* — Nathan Milakovich
(74) *Attorney, Agent, or Firm* — Keating & Bennett, LLP

(57) ABSTRACT

A multilayer ceramic capacitor includes dielectric layers made of a ceramic material and internal electrode layers laminated therein. The internal electrode layers each include dielectric columns provided therein. A solid solution layer in which S is solidly dissolved is provided at an interface between each of the dielectric columns and each of the internal electrode layers.

17 Claims, 6 Drawing Sheets

MULTILAYER CERAMIC CAPACITOR

CROSS REFERENCE TO RELATED APPLICATIONS

This application claims the benefit of priority to Japanese Patent Application No. 2021-161110 filed on Sep. 30, 2021. The entire contents of this application are hereby incorporated herein by reference.

BACKGROUND OF THE INVENTION

1. Field of the Invention

The present invention relates to a multilayer ceramic capacitor.

2. Description of the Related Art

Multilayer ceramic capacitors have been known in which a plurality of dielectric layers made of a ceramic material and a plurality of internal electrode layers are laminated. Such multilayer ceramic capacitors are required to be further reduced in size, increased in capacitance, and improved in reliability. Therefore, attempts have been made to reduce the thickness of the dielectric layers, reduce the thickness of the internal electrode layers, and increase the number of laminated layers.

Japanese Unexamined Patent Application, Publication No. 2013-42110 discloses a problem in that a short circuit occurs between the internal electrode layers occurs when the dielectric layers are thinned. Japanese Unexamined Patent Application, Publication No. 2013-42110 then discloses an invention in which conductive layers are provided between the internal electrode layers, thus overcoming the problem and suppressing a decrease in reliability.

However, when the internal electrode layers are thinned, a plurality of through holes (dielectric columns) are formed in the internal electrode layers. Since each of the plurality of through holes is filled with a portion of the adjacent dielectric layer, the through holes formed in the internal electrode layers are referred to as dielectric columns in the present application. Furthermore, when the internal electrode layers are thinned, the life of the multilayer ceramic capacitor, i.e., the reliability of the multilayer ceramic capacitor, may be reduced.

SUMMARY OF THE INVENTION

Preferred embodiments of the present invention provide multilayer ceramic capacitors that are each able to reduce or prevent a decrease in reliability.

The present inventors of preferred embodiments of the present invention have made a new discovery that, when the internal electrode layer is thinned, the electric field intensity locally increases in the dielectric layer due to balling (formation of balls) of the main component metal particles of the internal electrode layer, and as a result, the life, i.e., reliability, of the multilayer ceramic capacitors, decreases. Furthermore, as a result of extensive investigation, the inventors of preferred embodiments of the present invention have made a new discovery that, by coating the main component metal of the internal electrode layers with S, balling of the main component metal of the internal electrode layers is reduced or prevented, the local increase in the electric field intensity in the dielectric layer is reduced or prevented, and as a result, the decrease in the life, i.e., the reliability, of the multilayer ceramic capacitors is reduced or prevented. Thus, when the main component metal of the internal electrode layers is coated with S, multilayer ceramic capacitors are obtained in each of which a solid solution layer in which S is solidly dissolved is provided at the interface between the dielectric columns in the internal electrode layers and the internal electrode layers.

A multilayer ceramic capacitor according to a preferred embodiment of the present invention includes a plurality of dielectric layers made of a ceramic material and a plurality of internal electrode layers laminated therein, wherein the plurality of internal electrode layers each include a plurality of dielectric columns provided therein, and a dielectric column interface solid solution layer in which S is solidly dissolved is provided at an interface between each of the dielectric columns and each of the internal electrode layers.

According to preferred embodiments of the present invention, it is possible to reduce or prevent a decrease in reliability of the multilayer ceramic capacitor.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
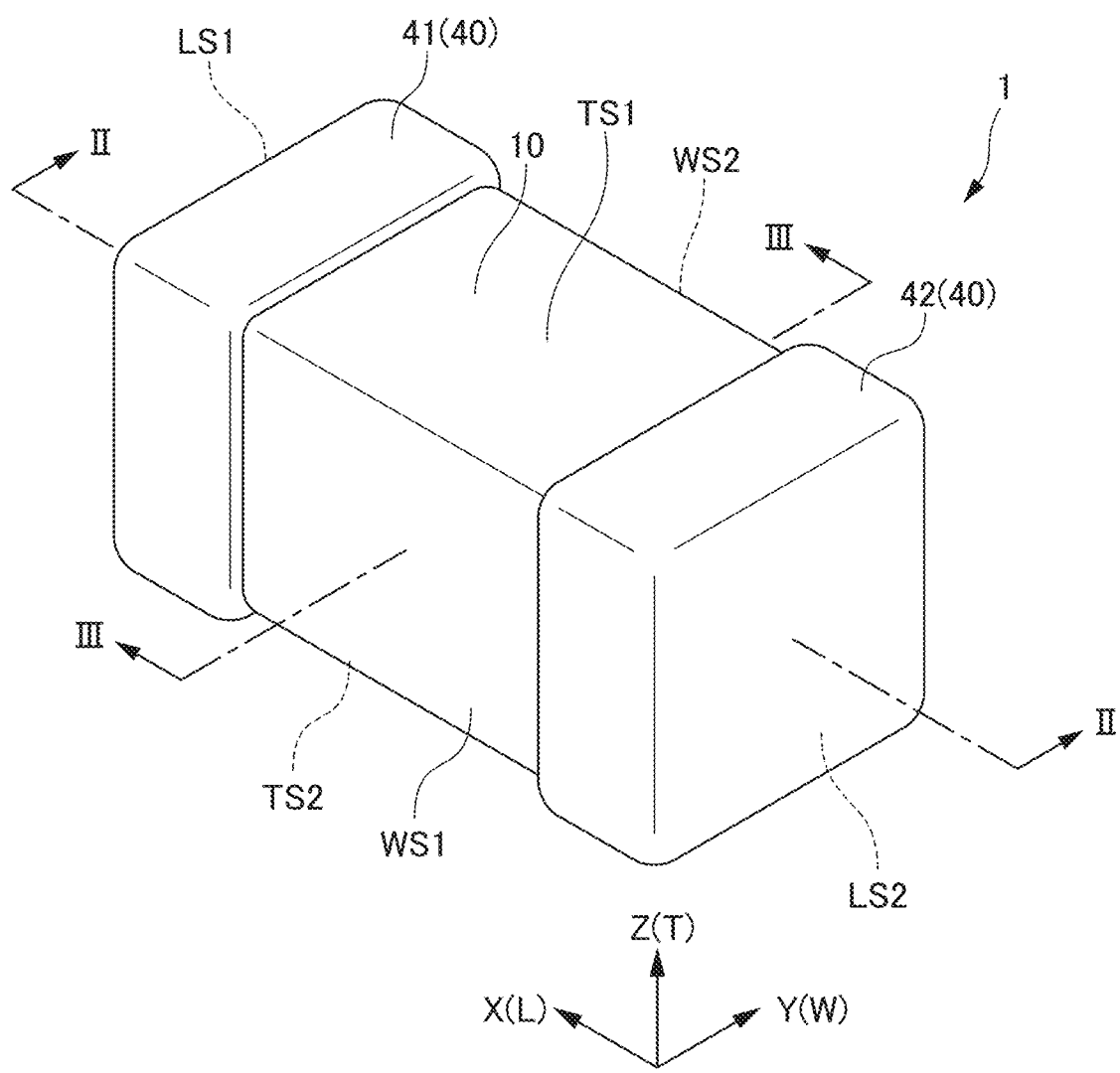
FIG. 1 is a perspective view of a multilayer ceramic capacitor according to a preferred embodiment of the present invention.

Examples of preferred embodiments of the present invention will be described below with reference to the accompanying drawings. The same reference characters shall be used for the same or corresponding portions and elements in the drawings.

Multilayer Ceramic Capacitor

Figure 2:
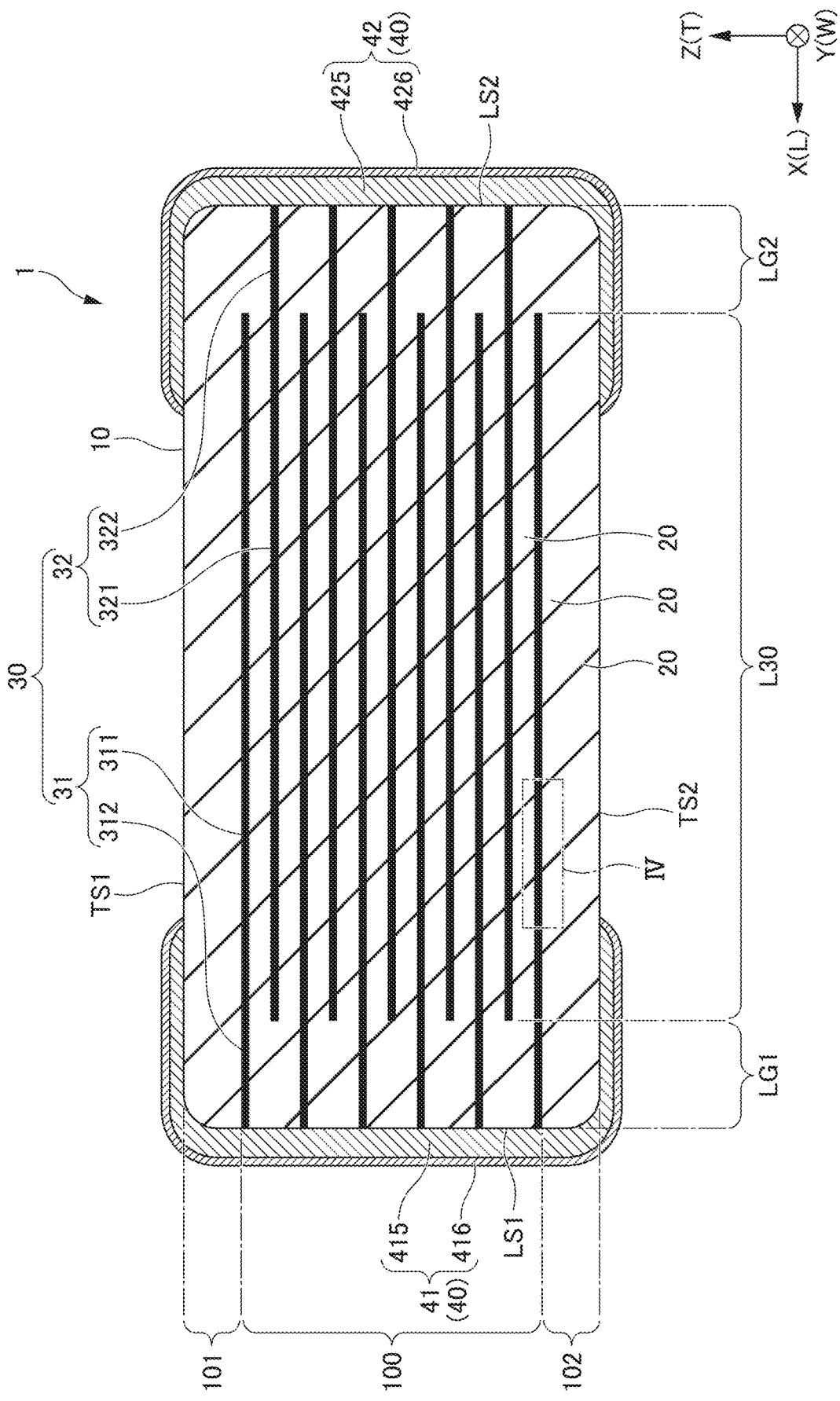
FIG. 2 is a cross-sectional view (LT cross section) taken along the line II-II of the multilayer ceramic capacitor shown in FIG. 1.
Figure 3:
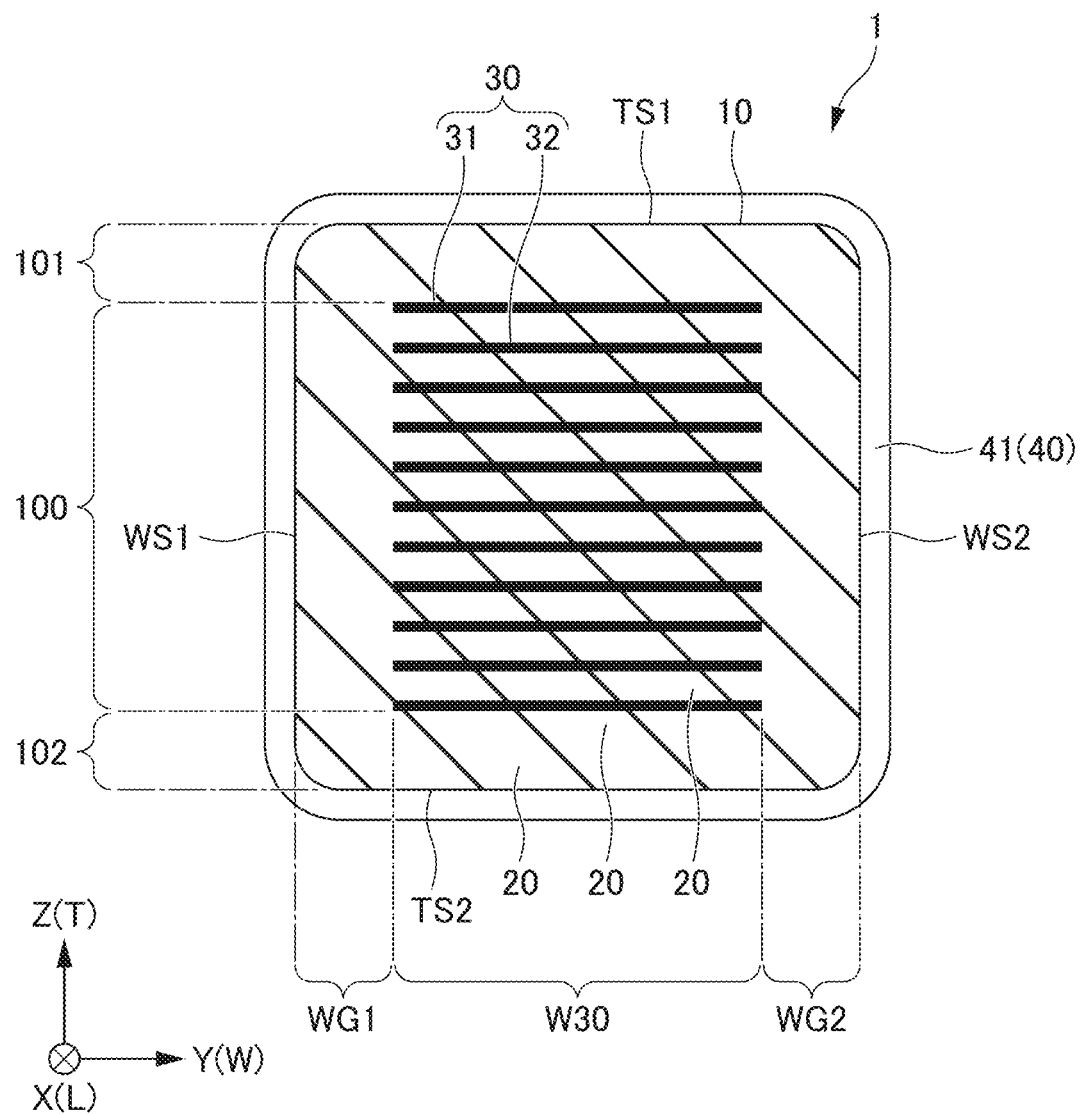
FIG. 3 is a cross-sectional view taken along the line III-III (WT cross section) of the multilayer ceramic capacitor shown in FIG. 1.

FIG. 1 is a perspective view of a multilayer ceramic capacitor according to a preferred embodiment of the present invention. FIG. 2 is a cross-sectional view taken along the line II-II of the multilayer ceramic capacitor illustrated in FIG. 1. FIG. 3 is a cross-sectional view taken along the line III-III of the multilayer ceramic capacitor illustrated in FIG. 1. The multilayer ceramic capacitor 1 illustrated in FIGS. 1 to 3 includes a multilayer body 10 and external electrodes 40. The external electrodes 40 include a first external electrode 41 and a second external electrode 42.

In each of FIGS. 1 to 3, an XYZ orthogonal coordinate system is shown. The X direction refers to the length direction L of the multilayer ceramic capacitor 1 and the multilayer body 10, the Y direction refers to the width direction W of the multilayer ceramic capacitor 1 and the multilayer body 10, and the Z direction refers to the lamination (stacking) direction T of the multilayer ceramic capacitor 1 and the multilayer body 10. Accordingly, the cross section illustrated in FIG. 2 is referred to also as the LT cross section, and the cross section illustrated in FIG. 3 is referred to also as the WT cross section.

The length direction L, the width direction W, and the lamination direction T are not necessarily in a relationship orthogonal or substantially orthogonal to one another, and may be in a relationship transverse to each other.

The multilayer body 10 has a rectangular or substantially rectangular parallelepiped shape, and includes a first main surface TS1 and a second main surface TS2 that are opposed to each other in the lamination direction T, a first side surface WS1 and a second side surface WS2 that are opposed to each other in the width direction W, and a first end surface LS1 and a second end surface LS2 that are opposed to each other in the length direction L.

It is preferable that the multilayer body 10 includes rounded corner portions and rounded ridgeline portions. The corner portions are where three of the surfaces of the multilayer body 10 meet transversely to each other, and the ridgeline portions are where two of the surfaces of the multilayer body 10 meet transversely to each other.

As illustrated in FIGS. 2 and 3, the multilayer body 10 includes a plurality of dielectric layers 20, and a plurality of internal electrode layers 30 that are laminated in the lamination direction T. The multilayer body 10 further includes, in the lamination direction T, an inner layer portion 100, and a first outer layer portion 101 and a second outer layer portion 102 sandwiching the inner layer portion 100.

The inner layer portion 100 includes some of the plurality of dielectric layers 20 and the plurality of internal electrode layers 30. In the inner layer portion 100, the plurality of internal electrode layers 30 are opposed to each other with the dielectric layers 20 interposed therebetween. The inner layer portion 100 generates a capacitance and defines and functions as a capacitor.

The first outer layer portion 101 is disposed adjacent to the first main surface TS1 of the multilayer body 10, and the second outer layer portion 102 is disposed adjacent to the second main surface TS2 of the multilayer body 10. More specifically, the first outer layer portion 101 is disposed between the first main surface TS1 and one internal electrode layer 30 closest to the first main surface TS1 among the plurality of internal electrode layers 30, and the second outer layer portion 102 is disposed between the second main surface TS2 and one internal electrode layer 30 closest to the second main surface TS2 among the plurality of internal electrode layers 30. The first outer layer portion 101 and the second outer layer portion 102 do not include any of the plurality of internal electrode layers 30, but include the remainder of the plurality of dielectric layers 20 other than those included in the inner layer portion 100. The first outer layer portion 101 and the second outer layer portion 102 each define and function as a protective layer to protect the inner layer portion 100.

Examples of the material for the dielectric layer 20 include a dielectric ceramic including $BaTiO_3$, $CaTiO_3$, $SrTiO_3$, $CaZrO_3$, or the like as a main component. Furthermore, the material for the dielectric layer 20 may additionally include a Mn compound, a Fe compound, a Cr compound, a Co compound, a Ni compound, or the like, as a sub-component. More specifically, the dielectric layer 20 includes a plurality of dielectric grains. The dielectric grains are barium titanate-based ceramics such as perovskite compounds including Ba and Ti. The dielectric grains may include, for example, at least one selected from La, Ce, Pr, Nd, Sm, Eu, Gd, Tb, Dy, Ho, Er, Tm, Yb, Lu, and Y as a subcomponent.

The thickness of the dielectric layer 20 is not particularly limited, but is preferably, for example, about 0.40 μm or more and about 0.50 μm or less, and more preferably about 0.40 μm or more and about 0.45 μm or less. The number of dielectric layers 20 is not particularly limited, but is preferably, for example, 100 or more and 2000 or less. The number of the dielectric layers 20 is a total number of the number of the dielectric layers of the inner layer portion and the number of the dielectric layers of the outer layer portions.

The plurality of internal electrode layers 30 include a plurality of first internal electrode layers 31 and a plurality of second internal electrode layers 32. The plurality of first internal electrode layers 31 and the plurality of second internal electrode layers 32 are alternately arranged in the lamination direction T of the multilayer body 10.

Each first internal electrode layer 31 includes a counter electrode portion 311 and an extension electrode portion 312, and each second internal electrode layer 32 includes a counter electrode portion 321 and an extension electrode portion 322.

The counter electrode portion 311 and the counter electrode portion 321 are opposed to each other with the dielectric layer 20 interposed therebetween in the lamination direction T of the multilayer body 10. The shapes of the counter electrode portion 311 and the counter electrode portion 321 are not particularly limited, and may be rectangular or substantially rectangular, for example. The counter electrode portion 311 and the counter electrode portion 321 are portions generating capacitances, and thus substantially define and function as capacitors.

The extension electrode portion 312 extends toward the first end surface LS1 of the multilayer body 10 from the counter electrode portion 311, and is exposed at the first end surface LS1. The extension electrode portion 322 extends toward the second end surface LS2 of the multilayer body 10 from the counter electrode portion 321, and is exposed at the second end surface LS2. The extension electrode portion 312 and the extension electrode portion 322 may have any shape, and it is satisfactory for them to have, for example, a rectangular or substantially rectangular shape.

Due to the configuration described above, the first internal electrode layers 31 are connected to the first external electrode 41 and are separated from the second end surface LS2 of the multilayer body 10, that is, from the second external electrode 42 with a gap existing therebetween. The second internal electrode layers 32 are connected to the second external electrode 42 and are separated from the first end surface LS1 of the multilayer body 10, that is, from the first external electrode 41, with a gap existing therebetween.

The first internal electrode layers 31 and the second internal electrode layers 32 include, for example, Ni as a main component. Furthermore, the first internal electrode layers 31 and the second internal electrode layers 32 may include, for example, at least one selected from metals such as Cu, Ag, Pd, and Au, or an alloy including at least one of these metals such as a Ag—Pd alloy, as the main component, or may include at least one of these as a component other than the main component. Furthermore, the first internal electrode layers 31 and the second internal electrode layers 32 may include dielectric particles having the same composition as that of the ceramic included in the dielectric layers 20, as a component other than the main component. In the present disclosure, a metal which is the main component is defined as the metal component having the highest weight percent.

The thicknesses of the first internal electrode layer 31 and the second internal electrode layer 32 are not particularly limited, but are preferably, for example, about 0.30 μm or more and about 0.40 μm or less, and more preferably about 0.30 μm or more and about 0.35 μm or less. The number of the first internal electrode layer 31 and the second internal electrode layer 32 is not particularly limited, but is preferably, for example, 10 or more and 1000 or less.

As illustrated in FIG. 3, the multilayer body 10 includes, in the width direction W, an electrode counter portion W30 in which the internal electrode layers 30 are opposed to each other, and a first side gap portion WG1 and a second side gap portion WG2 sandwiching the electrode counter portion W30 therebetween. The first side gap portion WG1 is positioned between the electrode counter portion W30 and the first side surface WS1, and the second side gap portion WG2 is positioned between the electrode counter portion W30 and the second side surface WS2. More specifically, the first side gap portion WG1 is located between the first side surface WS1 and the ends of the internal electrode layers 30 adjacent to the first side surface WS1. The second side gap portion WG2 is located between the second side surface WS2 and the ends of the internal electrode layers 30 adjacent to the second side surface WS2. The first side gap portion WG1 and the second side gap portion WG2 do not include any of the internal electrode layer 30, and include only the dielectric layers 20. The first side gap portion WG1 and the second side gap portion WG2 define and function as protective layers to protect the internal electrode layers 30. The first side gap portion WG1 and the second side gap portion WG2 are referred to also as W gaps.

As illustrated in FIG. 2, the multilayer body 10 includes, in the length direction L, the electrode counter portion L30 where the first internal electrode layers 31 and the second internal electrode layers 32 of the internal electrode layers 30 are opposed to each other, the first end gap portion LG1, and the second end gap portion LG2. The first end gap portion LG1 is located between the electrode counter portion L30 and the first end surface LS1, and the second end gap portion LG2 is located between the electrode counter portion L30 and the second end surface LS2. More specifically, the first end gap portion LG1 is located between the first end surface LS1 and the ends of the second internal electrode layers 32 adjacent to the first end surface LS1. The second end gap portion LG2 is located between the second end surface LS2 and the ends of the first internal electrode layers 31 adjacent to the second end surface LS2. The first end gap portion LG1 does not include the second internal electrode layers 32, and includes the first internal electrode layers 31 and the dielectric layers 20. The second end gap portion LG2 does not include the first internal electrode layers 31, and includes the second internal electrode layers 32 and the dielectric layers 20. The first end gap portion LG1 defines and functions as an extension electrode portion of the first internal electrode layers 31 toward the first end surface LS1, and the second end gap portion LG2 functions as an extension electrode portion of the second internal electrode layers 32 toward the second end surface LS2. The first end gap portion LG1 and the second end gap portion LG2 are referred to also as L gaps.

The counter electrode portion 311 of the first internal electrode layer 31 and the counter electrode portion 321 of the second internal electrode layer 32 are positioned in the electrode counter portion L30. The extension electrode portion 312 of the first internal electrode layer 31 is positioned in the first end gap portion LG1, and the extension electrode portion 322 of the second internal electrode layer 32 is positioned in the second end gap portion LG2.

Although the dimensions of the multilayer body 10 described above are not particularly limited, for example, the length in the length direction L is preferably about 0.05 mm or more and about 1.00 mm or less, the width in the width direction W is preferably about 0.10 mm or more and about 0.50 mm or less, and the thickness in the lamination direction T is preferably about 0.10 mm or more and about 0.50 mm or less.

The thicknesses of the dielectric layer 20 and the internal electrode layer 30 can be measured by, for example, a method in which an LT cross section in the vicinity of the middle in the width direction of the multilayer body is polished to be exposed, and is observed using a scanning electron microscope. Each of the thicknesses may be the average of values measured at a plurality of locations in the length direction, or may be the average of values measured at a plurality of locations in the lamination direction.

Similarly, the thicknesses of the multilayer body 10 can be measured by, for example, a method in which an LT cross section in the vicinity of the middle in the width direction of the multilayer body or a WT cross section in the vicinity of the middle in the length direction of the multilayer body is polished to be exposed, and is observed using a scanning electron microscope. The thickness of the multilayer body 10 may be the average of values measured at a plurality of locations in the length direction or the width direction. Similarly, the length of the multilayer body 10 can be measured by, for example, a method in which an LT cross section in the vicinity of the middle in the width direction of the multilayer body is polished to be exposed, and is observed using a scanning electron microscope. The length of the multilayer body 10 may be the average of values measured at a plurality of locations in the lamination direction. Similarly, the width of the multilayer body 10 can be measured by, for example, a method of observing a polished and exposed WT cross section of the vicinity of the middle in the length direction of the multilayer body, using a scanning electron microscope. The width of the multilayer body 10 may be the average of values measured at a plurality of locations in the lamination direction.

The external electrodes 40 include the first external electrode 41 and the second external electrode 42.

The first external electrode 41 is disposed on the first end surface LS1 of the multilayer body 10, and is connected to the first internal electrode layers 31. The first external electrode 41 may extend from the first end surface LS1 to a portion of the first main surface TS1 and a portion of the second main surface TS2. Furthermore, the first external electrode 41 may extend from the first end surface LS1 to a portion of the first side surface WS1 and a portion of the second side surface WS2.

The second external electrode 42 is disposed on the second end surface LS2 of the multilayer body 10, and is connected to the second internal electrode layers 32. The second external electrode 42 may extend from the second end surface LS2 to a portion of the first main surface TS1 and a portion of the second main surface TS2. Furthermore, the second external electrode 42 may extend from the second end surface LS2 to a portion of the first side surface WS1 and a portion of the second side surface WS2.

The first external electrode 41 includes a first base electrode layer 415 and a first plated layer 416, and the second external electrode 42 includes a second base electrode layer 425 and a second plated layer 426. The first external electrode 41 may include only the first plated layer 416, and the second external electrode 42 may include only the second plated layer 426.

The first base electrode layer 415 and the second base electrode layer 425 may each be, for example, a fired layer including metal and glass. The glass may be a glass component including, for example, at least one selected from B, Si, Ba, Mg, Al, Li, and the like. As a specific example, borosilicate glass may be used. The metal includes Cu as a main component. Furthermore, the metal may include, for example, at least one selected from metals such as Ni, Ag, Pd, and Au, or an alloy such as a Ag—Pd alloy, as the main component or as a component other than the main component.

The fired layer is produced by, for example, applying a conductive paste including metal and glass to the multilayer body by a dipping method, and firing the applied conductive paste. The applied conductive paste may be fired after or at the same time as firing the internal electrode layers. The fired layer may include a plurality of layers.

Alternatively, the first base electrode layer 415 and the second base electrode layer 425 may each be, for example, a resin layer including conductive particles and a thermosetting resin. The resin layer may be formed on the above-described fired layer, or may be formed directly on the multilayer body without formation of the fired layer.

The resin layer is produced by, for example, applying a conductive paste including conductive particles and a thermosetting resin to the multilayer body by a coating method and firing the applied conductive paste. The applied conductive paste may be fired after or at the same time as firing the internal electrode layers. The resin layer may include a plurality of layers.

The per-layer thicknesses of the first base electrode layer 415 and the second base electrode layer 425 provided as the fired layers or the resin layers are not particularly limited, and may be, for example, about 1 μm or more and about 10 μm or less.

Alternatively, the first base electrode layer 415 and the second base electrode layer 425 may each be a thin film layer that has, for example, a thickness of about 1 μm or less, includes deposited metal particles, and is formed by a thin film formation method such as sputtering or vapor deposition.

The first plated layer 416 covers at least a portion of the first base electrode layer 415, and the second plated layer 426 covers at least a portion of the second base electrode layer 425. The first plated layer 416 and the second plated layer 426 include, for example, at least one selected from metals such as Cu, Ni, Ag, Pd and Au, or an alloy such as an Ag—Pd alloy.

Each of the first plated layer 416 and the second plated layer 426 may include a plurality of layers. Each of the first plated layer 416 and the second plated layer 426 preferably has a two-layer structure of a Ni plated layer and a Sn plated layer. The Ni plated layer prevents the base electrode layer from being eroded by solder when a ceramic electronic component is mounted, and the Sn plated layer improves the wettability of the solder when the ceramic electronic component is mounted, thus enabling easy mounting.

The per-layer thicknesses of the first plated layer 416 and the second plated layer 426 are not particularly limited, and may be, for example, about 1 μm or more and about 10 μm or less.

Internal Electrode Layer

Figure 4:
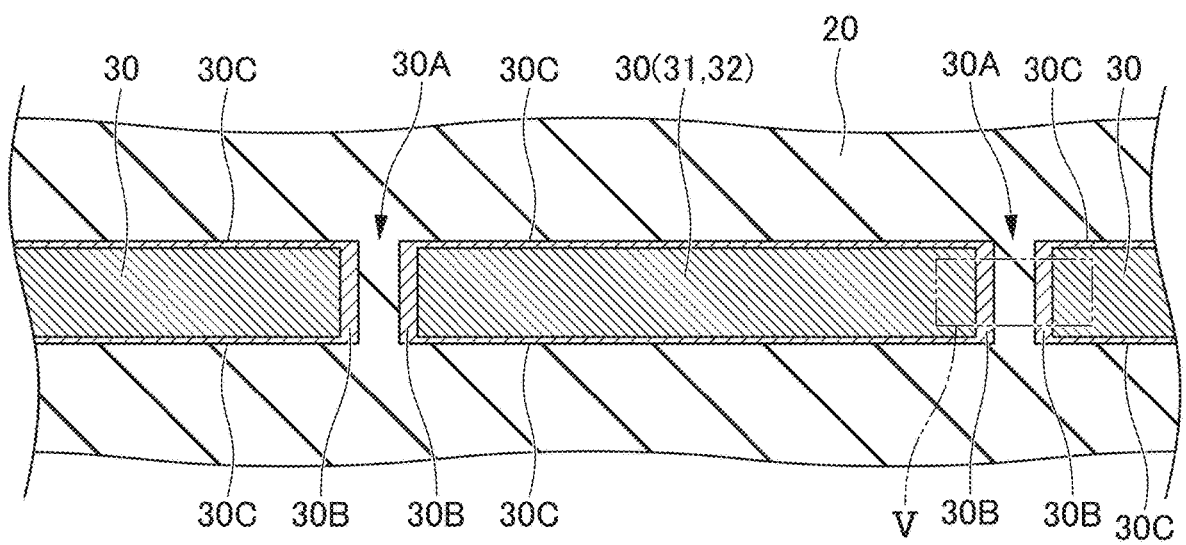
FIG. 4 is an enlarged cross-sectional view of a IV portion of the multilayer ceramic capacitor shown in FIG. 2.
Figure 5:
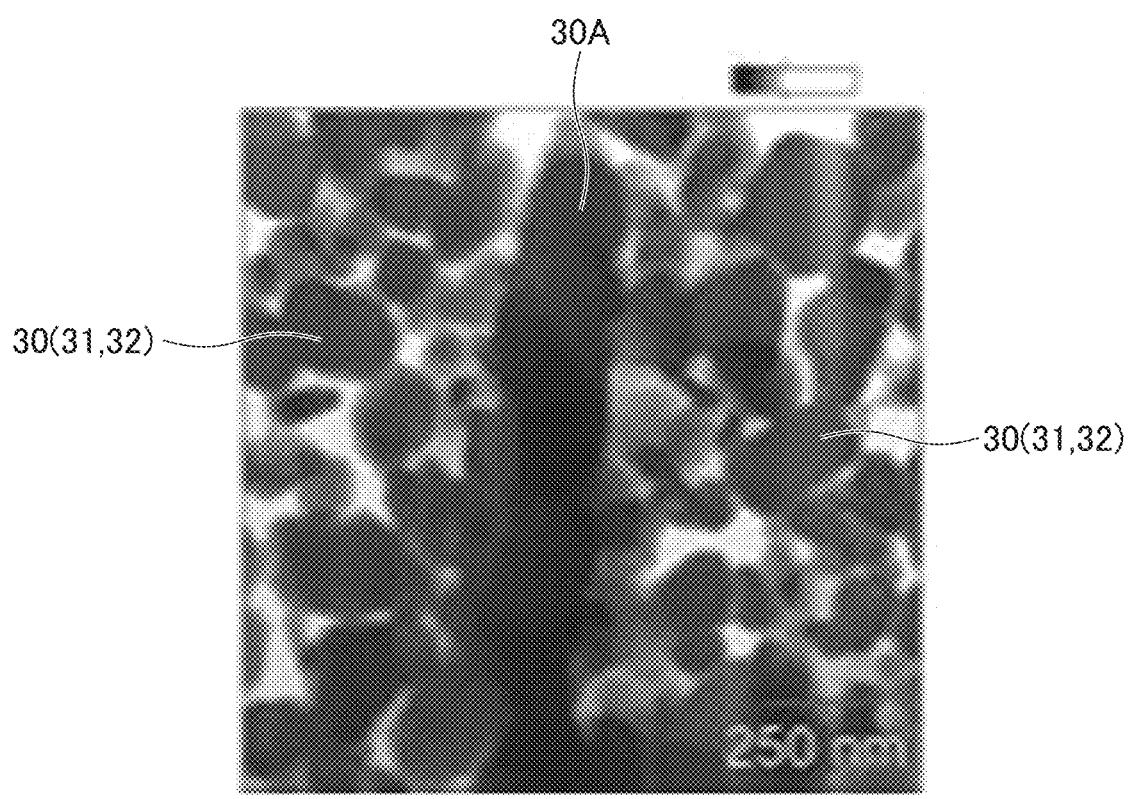
FIG. 5 is an example of a captured image of an internal electrode layer of a V portion of the multilayer ceramic capacitor shown in FIG. 4.
Figure 6:
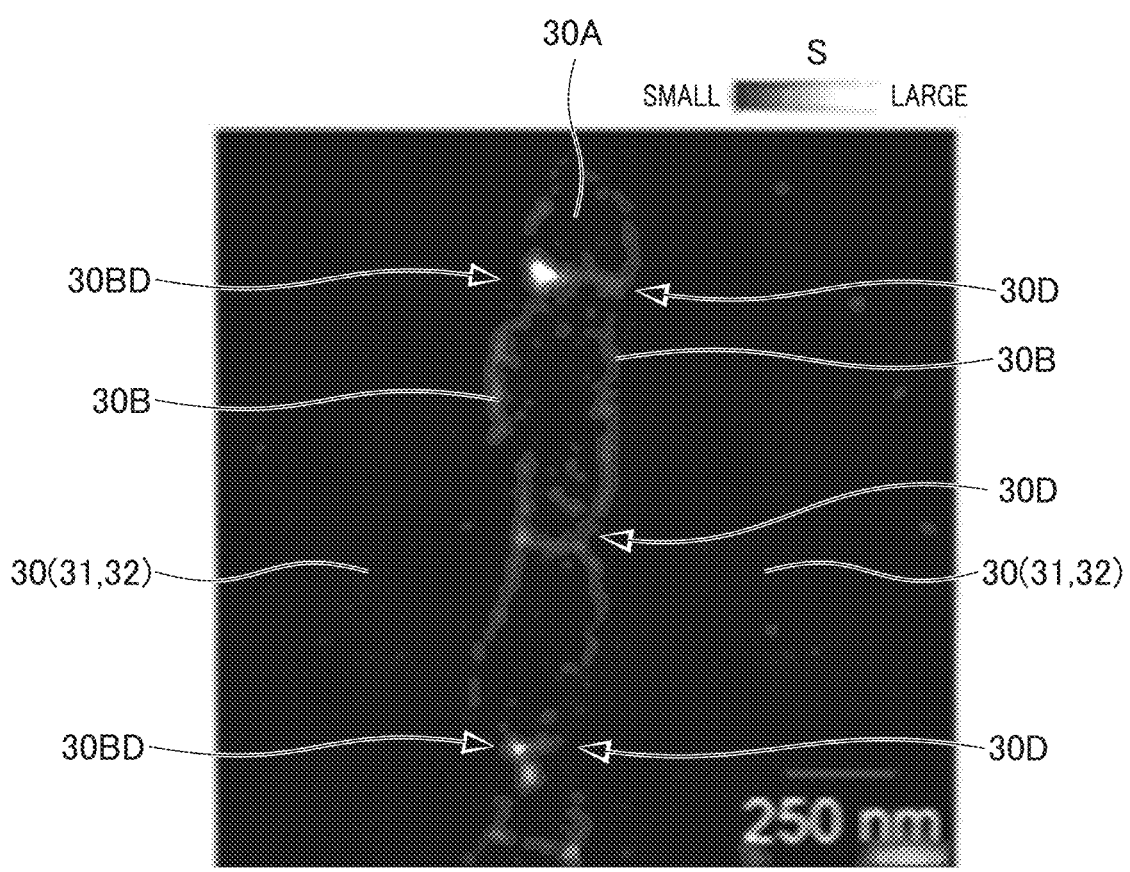
FIG. 6 is an example of an S component image in FIG. 5.

Next, the internal electrode layer 30, that is, the first internal electrode layer 31 and the second internal electrode layer 32 will be further described. FIG. 4 is an enlarged cross-sectional view of a IV portion of the multilayer ceramic capacitor shown in FIG. 2. FIG. 5 is an example of a captured image of the internal electrode layer of the V portion of the multilayer ceramic capacitor shown in FIG. 4, and FIG. 6 is an example of an S component image in FIG. 5. Examples of a method of acquiring the captured image of FIG. 5 and the S component image of FIG. 6 include wavelength dispersive X-ray analysis (WDX) or energy dispersive X-ray analysis (EDX) and scanning electron microscopy (SEM) or transmission electron microscopy (TEM).

For example, by reducing the thickness of the internal electrode layers 30, as shown in FIG. 4, a plurality of through holes 30A penetrating in the lamination direction are provided in each of the internal electrode layers 30, i.e., the first internal electrode layers 31 and the second internal electrode layers 32. Since the through holes 30A are filled with a portion of the adjacent dielectric layers 20 and 20, the through holes provided in the internal electrode layers 30 are referred to as dielectric columns 30A in the present disclosure. In other words, the plurality of dielectric columns 30A are provided in each of the internal electrode layers 30.

Here, when the dielectric columns 30A are provided in the internal electrode layers 30, electric field concentration occurs in the dielectric columns 30A, and the lifetime, i.e., reliability, of the multilayer ceramic capacitor 1 may decrease.

In this respect, as shown in FIGS. 4 to 6, a solid solution layers (dielectric column interface solid solution layers) 30B in which S is segregated and solidly dissolved are provided at the interface between the dielectric columns 30A and the internal electrode layers 30. More specifically, the solid solution layers 30B of S are provided at the interfaces between the internal electrode layers 30 and the dielectric columns 30A.

According to FIG. 6, a plurality of knots 30D are provided in the dielectric columns 30A in the lamination direction T, and S is segregated and solidly dissolved in the knots 30D. Among the solid solution layers 30B at the interface between the dielectric column 30A and the internal electrode layer 30, the S content is large in the portions 30BD corresponding to the knots 30D.

When the solid solution layers 30B of S are each provided at the interface with the dielectric column 30A, the insulating property is improved in the vicinity of the edge of the dielectric column 30A in which the solid solution layer 30B is provided, and concentration of the electric field in the dielectric column 30A can be reduced or prevented. Therefore, it is possible to reduce or prevent a decrease in the lifetime, i.e., reliability, of the multilayer ceramic capacitor 1.

Furthermore, for example, the reduction in the thickness of the dielectric layer 20 may increase the intensity of the electric field applied per layer, and may lower the lifetime, i.e., reliability, of the multilayer ceramic capacitor 1.

In this regard, as shown in FIG. 4, the solid solution layers (dielectric layer interface solid solution layers) 30C in which S is segregated and solidly dissolved are provided at the boundary between the dielectric layer 20 and the internal electrode layer 30. More specifically, the solid solution layers 30C of S may also be each provided at the interface between the internal electrode layer 30 and the dielectric layer 20. The content of S in the solid solution layer 30B is higher than the content of S in the solid solution layer 30C.

When the solid solution layers 30C of S are each provided at the interface with the dielectric layer 20, the insulating property is improved at the interface with the dielectric layer 20 where the solid solution layer 30C is formed, and an increase in electric field intensity in the dielectric layer 20 can be suppressed. Therefore, it is possible to reduce or prevent a decrease in the lifetime, i.e., reliability, of the multilayer ceramic capacitor 1.

In addition, S may be segregated and solidly dissolved at the crystal interface of the main component metal Ni in the internal electrode layer 30. For example, as described later, the main component metal Ni may be coated with S in the conductive paste for the internal electrode layer 30.

By coating the main component metal Ni with S, it is possible to reduce or prevent necking i.e., balling of the Ni metal particles of the internal electrode layer 30 which occurs at the time of degreasing, and it is possible to improve the smoothness of the internal electrode layer 30. In more detail, it is possible to reduce or prevent local thickening of the internal electrode layer 30 and local thinning of the dielectric layer 20. This can reduced or prevent a local increase in electric field intensity in the dielectric layer 20. Therefore, it is possible to reduce or prevent a decrease in the lifetime, i.e., reliability, of the multilayer ceramic capacitor 1.

Furthermore, it is possible to reduce or prevent generation of $Ni_3C$ by coating the main component metal Ni with S during degreasing, and as a result, it is possible to reduce or prevent volume expansion of the internal electrode layer 30 due to generation of $Ni_3C$, and it is possible to prevent structural defects such as cracking of the internal electrode layer 30 and delamination of the internal electrode layer 30 and the dielectric layer 20. Therefore, it is possible to reduce or prevent a decrease in the lifetime, i.e., reliability, of the multilayer ceramic capacitor 1.

The sum of the content (molar ratio) of S in the internal electrode layer 30, that is, the content (molar ratio) of S in the solid solution layer 30B at the interface with the dielectric column 30S, the content (molar ratio) of S in the solid solution layer 30C at the interface with the dielectric layer 20, and the content (molar ratio) of S in the crystal plane of Ni is preferably, for example, about 0.06 mol % or more and about 0.18 mol % or less, and more preferably about 0.10 mol % or more and about 0.13 mol % or less, with respect to 100 mol of the main component metal Ni of the internal electrode layer 30 at the middle portion in the width direction of the internal electrode. In addition, the sum is preferably, for example, about 0.4 mol % or more and about 0.7 mol % or less and more preferably about 0.5 mol % or more and about 0.6 mol % or less in a region about 5 μm inward from the end portion in the width direction of the internal electrode. By making the amount of S in the vicinity of the end portion of the internal electrode larger than the amount of S at the middle portion in the width direction of the internal electrode, it is possible to effectively prevent peeling in the vicinity of the end portion of the internal electrode.

When the content of S in the internal electrode layer 30 is, for example, less than about 0.06 mol %, necking, i.e., balling, of the main component metal Ni occurs, and the smoothness of the internal electrode layer 30 may be lowered, and structural defects such as interlayer separation are likely to occur. On the other hand, when the content of S in the internal electrode layer 30 exceeds, for example, about 0.18 mol %, the coverage of the main component metal Ni of the internal electrode layer 30 decreases during annealing.

The content mol % (mol ratio) of S with respect to 100 mol of the main component metal Ni in the internal electrode layer 30 can be measured by EDX mapping. The viewing angle is about 1000 μm×about 1000 μm.

In addition, Sn may be segregated and solidly dissolved at the interface between the internal electrode layer 30 and the dielectric layer 20. Sn may exist in a layered manner or may be interspersed. Sn may be solidly dissolved on the internal electrode layer side, or may be solidly dissolved on the dielectric layer side. Furthermore, Sn may be solidly dissolved at the interface of the dielectric grain of the dielectric layer.

When Sn is segregated and solidly dissolved at the interface between the internal electrode layer 30 and the dielectric layer 20, the insulating property is improved at this interface, and an increase in electric field intensity can be reduced or prevented. Therefore, it is possible to suppress a decrease in the lifetime, i.e., reliability, of the multilayer ceramic capacitor 1.

Manufacturing Method

Next, a non-limiting example of a method of manufacturing the multilayer ceramic capacitor 1 described above will be described. First, dielectric sheets for forming the dielectric layers 20 and a conductive paste for forming the internal electrode layers 30 are prepared. The conductive paste includes S. For example, a conductive paste including Ni metal particles whose surface is coated with S is used. The dielectric sheet may include Sn. The dielectric sheets and the conductive paste include a binder and a solvent. As the binder and the solvent, known materials can be used.

Next, the conductive paste is printed in, for example, predetermined patterns on the dielectric sheets to form internal electrode patterns on the dielectric sheets. The internal electrode patterns can be formed by a method such as, for example, screen printing, gravure printing, or the like.

Next, a predetermined number of dielectric sheets for the second outer layer portion 102 on which no internal electrode pattern is printed are laminated. The dielectric sheets for forming the inner layer portion 100, which have the internal electrode patterns printed thereon, are sequentially laminated on the laminated electric sheets for forming the second outer layer portion 102. On the top of the laminated dielectric sheets for forming the inner layer portion 100, a predetermined number of dielectric sheets for the first outer layer portion 101 on which no internal electrode pattern is printed are laminated. Thus, a laminated sheet is produced.

Next, the laminated sheet is pressed in the lamination direction by, for example, hydrostatic pressing, thus producing a multilayer block. Subsequently, the multilayer block is cut into multilayer chips of a predetermined size. At this time, the corners and ridgeline portions of each multilayer chip are rounded by barrel finishing or the like.

Next, the multilayer chip is heated and degreased. Although depending on the materials of the dielectric layer and the internal electrode layer, the degreasing temperature is preferably, for example, about 600° C. The atmospheric condition is preferably a reducing atmosphere. Thus, S tends to remain in the internal electrode layers.

At this time, as described above, by using the conductive paste including the Ni metal particles whose surface is coated with S, it is possible to reduce or prevent necking, i.e., balling of the Ni metal particles of the internal electrode layer at the time of degreasing, and to improve the smoothness of the internal electrode layers, and to reduce or prevent an increase in electric field intensity locally in the dielectric layers. Therefore, it is possible to reduce or prevent a decrease in the lifetime, i.e., reliability, of the multilayer ceramic capacitor 1.

Furthermore, as described above, by using the conductive paste including the Ni metal particles whose surface is coated with S, it is possible to reduce or prevent the generation of $Ni_3C$ at the time of degreasing, to reduce or prevent the volume expansion of the internal electrode layers due to the generation of $Ni_3C$ accordingly, and prevent structural defects such as cracking of the internal electrode layer and delamination of the internal electrode layer and the dielectric layer. Therefore, it is possible to reduce or prevent a decrease in the lifetime, i.e., reliability, of the multilayer ceramic capacitor 1.

Next, the multilayer chip is fired to produce the multilayer bodies 10. The firing temperature is preferably, for example, reduce or prevent 900° C. or higher and reduce or prevent 1400° C. or lower, depending on the materials forming the dielectric layers and the internal electrode layers. At this time, the plurality of dielectric columns 30A are formed in the internal electrode layers 30, and the solid solution layers 30B in which S is segregated and solidly dissolved are formed at the interfaces between the dielectric columns 30A and the internal electrode layers 30. Furthermore, the solid solution layers 30C in which S is segregated and solidly dissolved are formed between the dielectric layers 20 and the internal electrode layers 30. In addition, S may remain at the crystal interfaces of the main component metal Ni in the internal electrode layers 30. In other words, S may be segregated and solidly dissolved. Further, Sn may segregate and solid-solute at the interface between the internal electrode layer 30 and the dielectric layer 20.

Next, the first end surface LS1 of each multilayer body 10 is dipped into a conductive paste as an electrode material for the base electrode layer, by a dipping method, for example, such that the first end surface LS1 is coated with the conductive paste for forming the first base electrode layer 415. Similarly, the second end surface LS2 of each multilayer body 10 is dipped into a conductive paste as an electrode material for the base electrode layer, by a dipping method, for example, such that the second end surface LS2 is coated with the conductive paste for forming the second base electrode layer 425. Thereafter, these conductive pastes are fired to form the first base electrode layer 415 and the second base electrode layer 425, which are fired layers. The firing temperature is preferably, for example, about 600° C. or higher and about 900° C. or lower.

As described above, for example, the first base electrode layer 415 and the second base electrode layer 425 may be formed as resin layers, by applying a conductive paste including conductive particles and a thermosetting resin by an application method, and then firing the applied conductive paste. Alternatively, for example, the first base electrode layer 415 and the second base electrode layer 425 may be formed as thin films, by a thin film formation method such as sputtering or vapor deposition.

Thereafter, the first plated layer 416 is formed on the surface of the first base electrode layer 415, thus forming the first external electrode 41. The second plated layer 426 is formed on the surface of the second base electrode layer 425, thereby forming the second external electrode 42. Through the foregoing steps, the multilayer ceramic capacitor 1 described above is produced.

As described above, according to the multilayer ceramic capacitor 1 of the present preferred embodiment, for example, the plurality of dielectric columns 30A are provided in the internal electrode layers 30 by reducing the thickness of the internal electrode layers 30, and the solid solution layers 30B in which S is solidly dissolved are provided at the interface between the dielectric columns 30A and the internal electrode layer 30. With such a configuration, the insulating property is improved in the vicinity of the edge of each of the dielectric columns 30A in which the solid solution layer 30B is formed, and it is possible to reduce or prevent concentration of the electric field in the dielectric column 30A. Therefore, it is possible to reduce or prevent a decrease in the lifetime, i.e., reliability, of the multilayer ceramic capacitor 1.

Furthermore, according to the multilayer ceramic capacitor 1 of the present preferred embodiment, the solid solution layers 30C in which S is solidly dissolved may be provided at the interfaces between the internal electrode layers 30 and the dielectric layers 20. Furthermore, the content of S in the solid solution layer 30B is higher than the content of S in the solid solution layer 30C. With such a configuration, the insulation property is improved at the interfaces with the dielectric layers 20 in which the solid solution layers 30C are provided and, for example, it is possible to reduce or prevent an increase in electric field intensity due to the reduction in thickness of the dielectric layers 20. Therefore, it is possible to reduce or prevent a decrease in the lifetime, i.e., reliability, of the multilayer ceramic capacitor 1.

According to the multilayer ceramic capacitor 1 of the present preferred embodiment, S may be solidly dissolved at the crystal interface of the main component metal Ni of the internal electrode layers 30. For example, the main component metal Ni may be coated with S in the conductive paste for the internal electrode layers 30. With such a configuration, it is possible to reduce or prevent necking, i.e., balling, of the Ni metal particles of the internal electrode layers 30 which occurs during degreasing, to improve smoothness of the internal electrode layer 30, and to reduce or prevent an increase in electric field intensity locally in the dielectric layer 20. Furthermore, it is possible to reduce or prevent the generation of $Ni_3C$ at the time of degreasing, and as a result, it is possible to reduce or prevent the volume expansion of the internal electrode layers 30 due to the generation of $Ni_3C$, and it is possible to prevent structural defects such as cracking of the internal electrode layer 30 and delamination of the internal electrode layer 30 and the dielectric layer 20. Therefore, it is possible to reduce or prevent a decrease in the lifetime, i.e., reliability, of the multilayer ceramic capacitor 1.

While preferred embodiments of the present invention have been described above, the present invention is not limited to the preferred embodiments described above, and various changes and modifications thereto are possible without departing from the scope and spirit of the present invention. The scope of the present invention, therefore, is to be determined solely by the following claims. For example, as a manufacturing method of the multilayer ceramic capacitor, a method of applying a dielectric of the side gap in the side surfaces WS1 and WS2 of the multilayer body 10 in the width direction W later may be used. In this case, both end portions of the internal electrode layer in the width direction W are aligned (for example, aligned with an error of about 5 μm).

What is claimed is:

1. A multilayer ceramic capacitor comprising:
   a plurality of dielectric layers and a plurality of internal electrode layers laminated therein; wherein
   a dielectric layer interface solid solution layer in which S is solidly dissolved is provided at an interface between each of the dielectric layers and each of the internal electrode layers.

2. The multilayer ceramic capacitor according to claim 1, wherein
   the plurality of internal electrode layers include through holes;
   a dielectric solid solution portion in which S is solidly dissolved is provided at a region between each of the through holes and each of the dielectric layers interface solid solution layers; and
   a content of S in the dielectric solid solution portion is higher than a content of S in the dielectric layer interface solid solution layer.

3. The multilayer ceramic capacitor according to claim 1, wherein
   each of the plurality of internal electrode layers includes Ni as a main component; and
   S is solidly dissolved at a crystal interface of the Ni.

4. The multilayer ceramic capacitor according to claim 3, wherein a content of S the internal electrode layer is about 0.06 mol % or more and about 0.18 mol % or less with respect to 100 mol of Ni in each of the internal electrode layer at a middle portion in a width direction of the multilayer ceramic capacitor.

5. The multilayer ceramic capacitor according to claim 1, wherein
   the internal electrode layers each have a thickness of about 0.3 μm or more and about 0.4 μm or less; and
   the dielectric layers each have a thickness of about 0.4 μm or more and about 0.5 μm or less.

6. The multilayer ceramic capacitor according to claim 5, wherein the dielectric layers each have a thickness of about 0.4 μm or more and about 0.45 μm or less.

7. The multilayer ceramic capacitor according to claim 5, wherein the internal electrode layers each have a thickness of about 0.3 μm or more and about 0.35 μm or less.

8. The multilayer ceramic capacitor according to claim 1, wherein each of the dielectric layers includes $BaTiO_3$, $CaTiO_3$, $SrTiO_3$, or $CaZrO_3$ as a main component.

9. The multilayer ceramic capacitor according to claim 8, wherein each of the dielectric layers includes a Mn compound, a Fe compound, a Cr compound, a Co compound, or a Ni compound as a sub-component.

10. The multilayer ceramic capacitor according to claim 1, wherein each of the dielectric layers includes a plurality of dielectric grains.

11. The multilayer ceramic capacitor according to claim 10, wherein the plurality of dielectric grains are barium titanate-based ceramics including Ba and Ti.

12. The multilayer ceramic capacitor according to claim 11, wherein each of the plurality of dielectric grains includes at least one of La, Ce, Pr, Nd, Sm, Eu, Gd, Tb, Dy, Ho, Er, Tm, Yb, Lu, or Y as a subcomponent.

13. The multilayer ceramic capacitor according to claim 1, wherein a number of the dielectric layers is 100 or more and 2000 or less.

14. The multilayer ceramic capacitor according to claim 1, wherein each of the internal electrode layers includes at least one of Cu, Ag, Pd, or Au, or an alloy including at least one of Cu, Ag, Pd, or Au as the main component.

15. The multilayer ceramic capacitor according to claim 1, wherein a number of the internal electrode layers is 10 or more and 1000 or less.

16. A multilayer ceramic capacitor comprising:
    a plurality of dielectric layers and a plurality of internal electrode layers laminated therein; wherein
    the plurality of internal electrode layers includes dielectric columns; and
    a dielectric column interface solid solution layer in which S is solidly dissolved is provided at an interface between each of the dielectric columns and each of the internal electrode layers.

17. A multilayer ceramic capacitor comprising:
    a multilayer body includes a plurality of dielectric layers and a plurality of internal electrode layers laminated therein; and
    external electrodes disposed on the multilayer body, and connected to the internal electrode layers; wherein
    the plurality of internal electrode layers include through holes penetrating in the internal electrode layers; and
    a dielectric column interface solid solution layer in which S is solidly dissolved is provided at each of the through holes.

* * * * *